United States Patent [19]

Clark

[11] 4,265,144
[45] May 5, 1981

[54] DETENT RELEASE FOR POWER SHIFT TRANSMISSION SELECTOR VALVE

[75] Inventor: Brian C. Clark, Brown Deer, Wis.

[73] Assignee: Allis-Chalmers Corporation, Milwaukee, Wis.

[21] Appl. No.: 972,863

[22] Filed: Dec. 26, 1978

[51] Int. Cl.³ ............... F16H 47/00; B60K 41/22; F15B 15/04
[52] U.S. Cl. .................. 74/752 C; 74/527; 74/868; 192/3.57; 137/625.69
[58] Field of Search ............ 74/752 C, 364, 527, 74/867, 868, 740; 192/87.19, 3.57, 4 A; 137/624.27, 625.69; 251/297

[56] References Cited

U.S. PATENT DOCUMENTS

| | | | |
|---|---|---|---|
| 2,848,014 | 8/1958 | Tennis | 137/624.27 |
| 3,093,158 | 6/1963 | Tennis | 251/297 |
| 3,125,201 | 3/1964 | Fisher | 192/4 A |
| 3,247,768 | 4/1966 | Tennis | 137/624.27 X |
| 3,465,649 | 9/1969 | Eggers et al. | 137/624.27 X |
| 3,476,148 | 11/1969 | McMillen | 251/297 X |
| 3,618,634 | 11/1971 | Nelson et al. | 137/624.27 |
| 3,640,146 | 2/1972 | Barnes | 137/624.27 X |
| 3,757,915 | 9/1973 | Momose | 192/87.19 |
| 3,790,125 | 2/1974 | Swatty | 251/297 X |
| 3,790,129 | 2/1974 | Pauls | 251/297 |
| 3,855,875 | 12/1974 | Hansen | 192/3.57 X |
| 3,866,880 | 2/1975 | Schexnayder | 251/297 |
| 3,891,182 | 6/1975 | Schwerin | 251/297 |
| 3,948,366 | 4/1976 | Kitano et al. | 192/4 A |
| 4,049,235 | 9/1977 | Singleton | 251/297 |
| 4,185,660 | 1/1980 | Faix | 251/297 X |

FOREIGN PATENT DOCUMENTS 2259969 12/1972 Fed. Rep. of Germany ......... 251/297
1227539 4/1971 United Kingdom .................. 251/297

Primary Examiner—C. J. Husar
Assistant Examiner—Mark A. Daugherty
Attorney, Agent, or Firm—Arthur L. Nelson

[57] ABSTRACT

A hydraulic detent release for a power shift transmission selector valve which releases the detent with decay of fluid pressure in the valve. The hydraulic detent releases in response to pressure decay in an inching valve which causes the selector valve to return to the low speed position when the inching valve is operated.

14 Claims, 4 Drawing Figures

DETENT RELEASE FOR POWER SHIFT TRANSMISSION SELECTOR VALVE

This invention relates to a hydraulic valve and more particularly to a hydraulic detent release in the selector valve of a power shift transmission which operates in response to decay of pressure in the inching valve operating a hydraulic clutch to assure that the selector valve will be in the low range position when the inching valve is operated.

Tractors with multiple speed power shift transmissions have hydraulically actuated clutches any of which may be selected and shifted when the vehicle is moving. The pressurized fluid supplied to the plurality of hydraulic actuators for the clutches is modulated to provide smooth transition of power.

It is desirable, however, to control the pressurization of fluid supplied to the hydraulic clutch manually for inching the vehicle forwardly or rearwardly from a dead stop. During inching, the pressure of the hydraulic fluid supplied to the hydraulic actuator of the clutch is manually modulated by throttling the flow of fluid as it passes through the inching valve. The resulting modulation of clutch torque allows the clutch to be slipped. Accordingly, it is desirable to shift the vehicle transmission to its low speed range which is designed to accommodate this slippage and provides smoother starting. Previously, this had been accomplished through mechanical means by down shifting of the vehicle transmission when the operator is inching the vehicle. A mechanical linkage is difficult to adjust for the proper shift down point to mechanically shift the vehicle transmission to the low speed range. Accordingly, before the clutch pressure has been reduced, this invention provides a means whereby responsive to the operator's manual control, the pressure decay in the clutch operates as a pilot pressure to the detent of the power shift transmission selector valve which releases the detent and allows a biasing means to shift the power shift transmission selector valve to the low range response to the pressure decay. This eliminates any need for mechanical adjustment on the clutch control pedal and the shift down pressure is established responsive to disengagement of the engine clutch through reduction of pressure for inching. The selector valve down shift to the low range position is accomplished before the clutch pressure has dropped enough to allow clutch slippage for inching of the vehicle.

Accordingly, it is an object of this invention to provide a detent release in a hydraulic valve responsive to pressure decay in the hydraulic system.

It is another object of this invention to use the pressure decay in a hydraulic clutch manually operated to provide inching of the vehicle to control the release of the detent mechanism in a power shift transmission selector valve to down shift the transmission to the low range during the inching operation.

It is a further object of this invention to utilize pressure decay in the hydraulically actuated clutch circuit to operate a power shift transmission detent mechanism in the selector valve to down shift the transmission for the inching operation.

It is a further object of this invention to provide a detent in a power shift transmission control valve operating in response to pressure decay in the inching valve operating the clutch for inching of the vehicle. A power shift transmission automatically shifts to the low speed range during the inching operation.

The objects of this invention are accomplished by providing a power shift transmission selector valve for selectively shifting the transmission and manually operated hydraulic engine clutch for inching of the vehicle from a stationary position. To assure the power shift transmission is in the low speed range during the inching operation, the pressurized fluid for the hydraulically actuated clutches is supplied to the detent mechanism of the power shift transmission selector valve. The down shifting operation of the power shift transmission is automatically controlled responsive to pressure decay in the clutch as the inching valve is operated. This assures that clutch slippage at reduced pressure during the inching operation will always occur in the low range clutch.

Referring to the drawings, the preferred embodiment of this invention is illustrated.

Figures 1, 2:
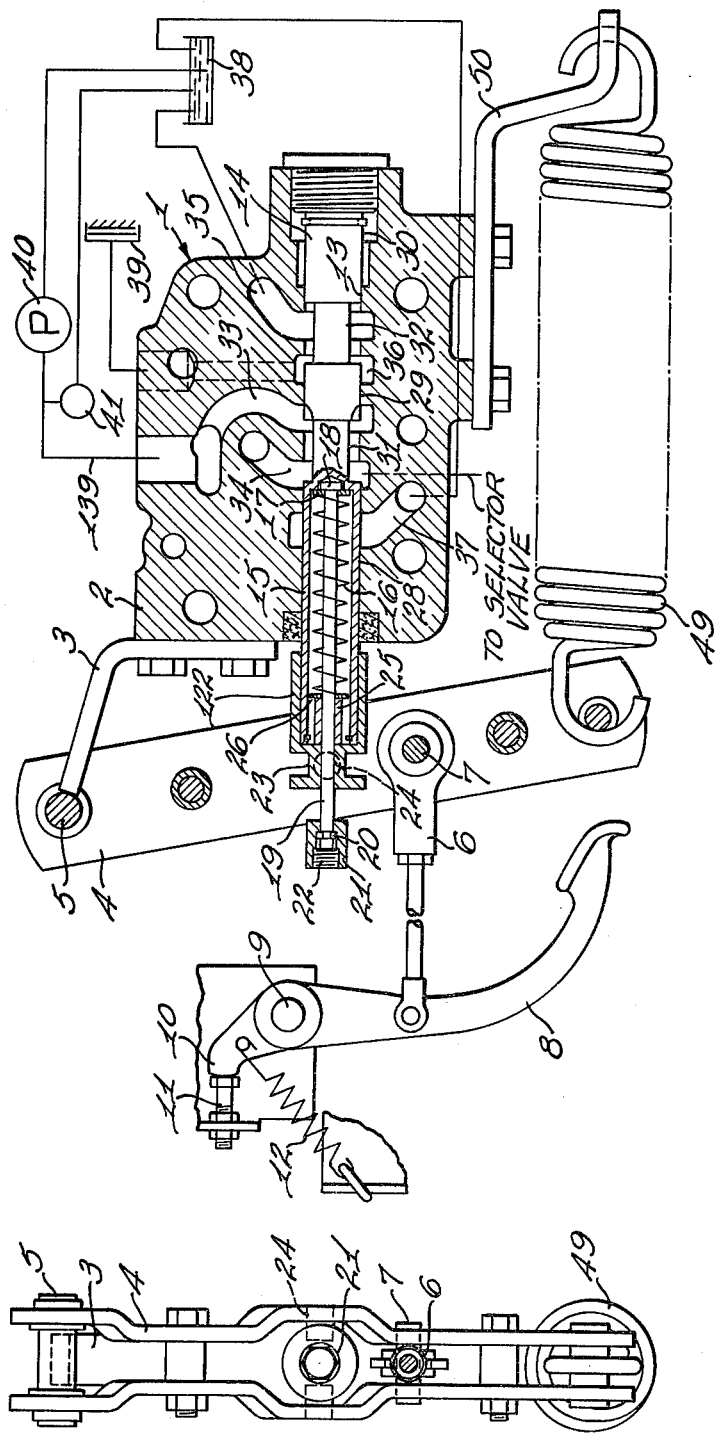
FIG. 1 is a cross section view of the inching valve.
FIG. 2 is an end view of the integral inching lever.

Referring to FIG. 1, the inching valve 1 includes a housing 2 which supports the bracket 3 for pivotally supporting the lever 4. The lever 4 is pivotally supported on the pin 5 and pivotally connected by the pin 7 to the link 6. The link 6 is also pivotally connected to the pedal 8. The pedal 8 is pivotally supported on the vehicle chassis by the pin 9 and fitted with a return stop 10 which engages the bolt 11 to adjustably set the return position of the pedal. The return spring 12 returns the brake pedal to its normally retracted position as shown.

The inching valve housing 2 defines a central opening 13 which receives the spool 14. The spool 14 defines a sleeve portion 15 on the rearward end which receives the return spring 16. The return spring engages the spring seat 17 on the head 18 of bolt 19. The bolt 19 threadedly engages the nut 20 received within the cap 21. The cap 21 receives the plug 22 engaging the end of the bolt 19. The cover 122 is formed with an annular recess 23 which receives the pins 24 on the lever 4 for reciprocating the spool 14. Received within the sleeve portion 15 is the bushing 25 engaging the end wall of the cover 122. The bushing 25 engages the washer 26 compressively positioning the spring 16 between the washer 26 and spring seat 17. Normally, the inching spring 16 biases the spool 14 to the full clutch pressure position when the pedal 8 is in its normally retracted position as shown in FIG. 1.

The spool 14 is formed with the lands 28, 29 and 30. Intermediate the lands are annular grooves 31 and 32.

The valve inlet chamber 33 is connected to the pump and forms a chamber in communication and surrounding the cylindrical opening 13. The chamber 34 is normally in communication with the inlet chamber 33 through the annular groove 31 when the inching valve is in its retracted position. Sump chamber 35 is then in communication with the brake actuating chamber 36 which is in communication through annular groove 32 and the cylindrical opening 13. Similarly, a sump chamber 37 encircles the cylindrical opening 13 to provide discharge from the clutch chamber 34 when the clutch is disengaged.

The inching valve 1 is in communication with a sump 38 and a transmission brake 39. The inching valve is connected through the conduit 139 to the pump 40. The discharge side of the pump 40 discharges into conduit 139 and is provided with a pressure regulating valve 41 returning to sump 38, but maintaining a constant fluid pressure at the inlet chamber 33.

Figure 3:
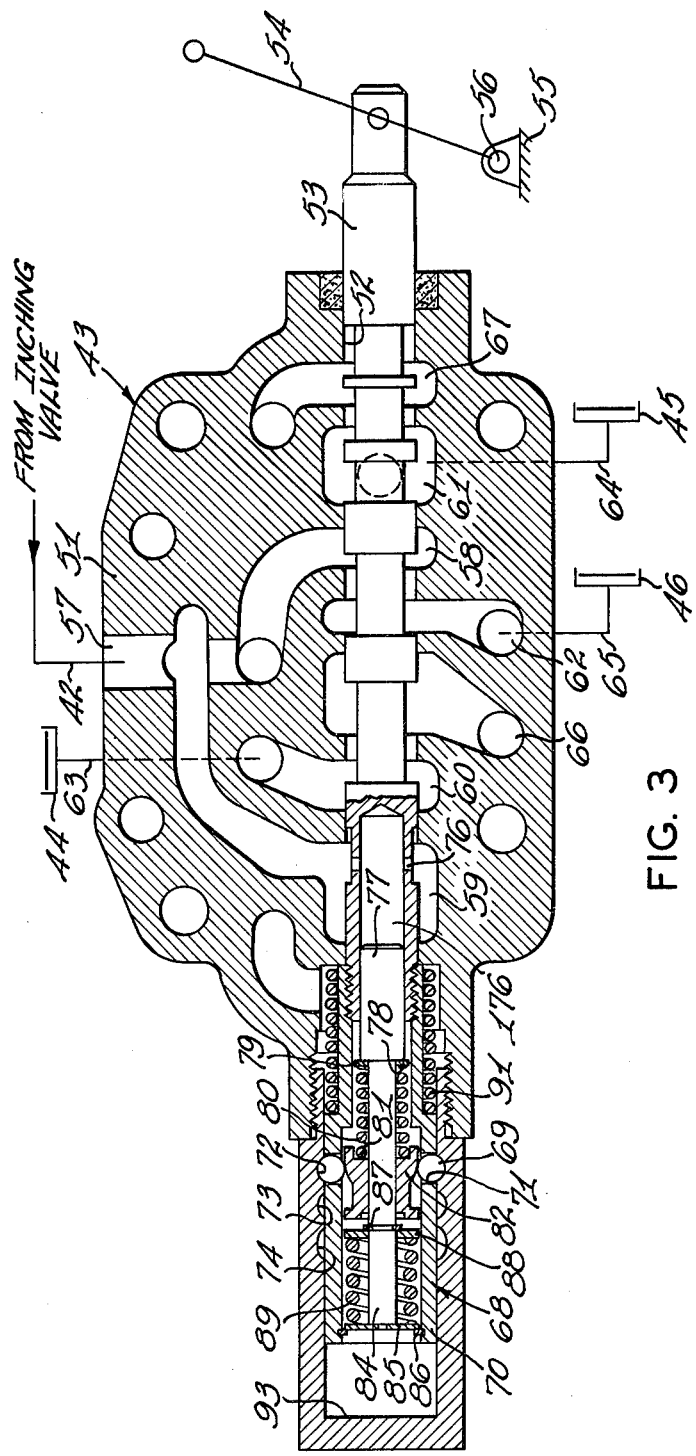
FIG. 3 illustrates a cross section view of the power shift transmission selector valve and detent mechanism.
Figure 4:
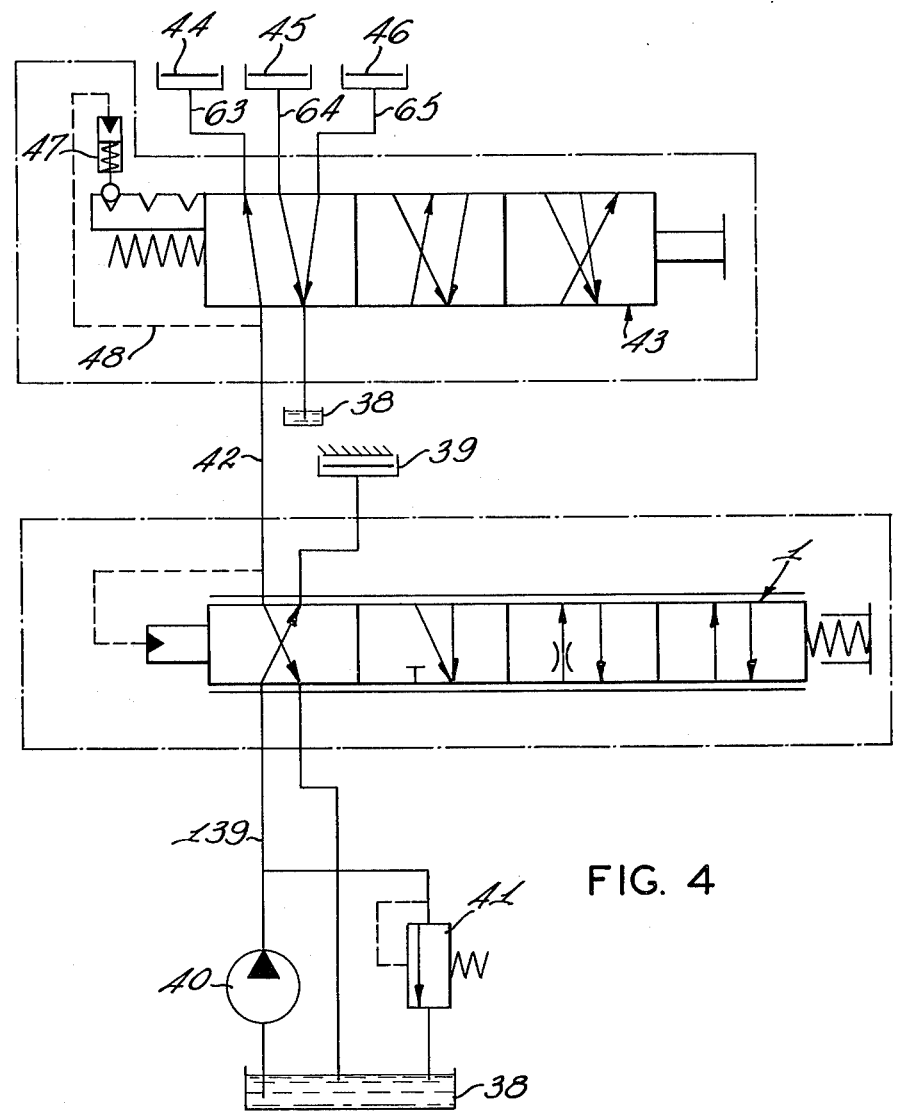
FIG. 4 is a schematic diagram of the hydraulic power shift transmission and the control valves.

The inching valve 1 is also provided with the passage 34 in communication with the conduit 42 which leads to the selector valve inlet passage 57 shown in FIG. 3. The selector valve 43 operates a power shift transmission which includes the low range clutch 44, the intermediate range clutch 45 and the high range clutch 46. The inlet passage 57 is also in communication with the chamber 176 of the detent 47 through the pilot passage 76. Selector valve 43 is shown in cross section in FIG. 3 and the selector valve and inching valve are shown in the schematic diagram as shown in FIG. 4. Retraction spring 49 is connected between the lower end of the lever 4 and the bracket 50 to normally retract the lever 4 when a clutch is engaged. The clutch engaging position is shown in FIG. 1.

Referring to FIG. 3, the selector valve 43 is shown with three forward speed positions of the power shift transmission. The selector valve is connected through the inching valve to the pump as shown in FIG. 4. The housing 51 of the selector valve defines a central opening 52 which receives the spool 53. The spool 53 is pivotally connected to the control lever 54 which is pivotally mounted on the chassis 55 by means of the pin 56.

The inching valve outlet pressure is supplied to the passage 57 through conduit 42 from the inching valve 1. The passage 57 is in communication with the chamber 58 and chamber 59 in the selector valve. The chambers 58 and 59 are in communication with the central openings 52 and encircle the central opening.

Low speed clutch chamber 60, the intermediate speed clutch chamber 61 and the high speed clutch chamber 62 also form annular chambers encircling the central opening 52. Each of these chambers is connected to the respective conduits 63, 64 and 65 for actuating the low speed clutch 44 and the intermediate speed clutch 45 and the high speed clutch 46. The sump chambers 66 and 67 provide for discharge from the clutch chambers 60, 61 and 62 upon sequential operation of the three-speed selector valve. The selector valve 43 is also provided with a detent mechanism 68 on the end of the spool 53. The end of the spool 53 forms a sleeve portion 70. The annular groove 72 defines the high speed clutch engaging position while annular groove 73 defines the intermediate speed clutch engaging position and the low speed clutch engaging position is defined by the annular groove 74.

Inching pressure from the output of the inching valve is supplied through the radial passage 76 to the pressurizing chamber 176 in the sleeve 53. The load piston 77 is formed with a shoulder 78 for engaging the spring seat 79. The detent sleeve spring 80 seats on the spring seat 79 as well as the radial facing 81 on the cammed detent sleeve 82. The detent sleeve spring 80 normally biases the cammed detent sleeve 82 into engaging position with the detent element 69. The stem 84 of the load piston 77 abuts against the washer 85 forming a spring seat engaging the snap ring 86. This limits the left hand movement of the load piston 77. The snap ring 87 engages the washer 88 to compressively position the return spring 89 away from engagement with the cammed detent sleeve 82.

The device operates in the following manner. Normally, the inching valve is retracted in the position shown in FIG. 1. The pump output from pump 40 is permitted to flow through the valve to the inching valve outlet conduit 42 to the selector valve 43. Essentially, the output pump pressure is transmitted to the chamber 57 and is available for actuating the power shift transmission. The manual control lever 54 is selectively positioned for connecting the passage 57 to any one of the clutch actuating chambers 60, 61 and 62. Manual movement of the spool 53 will selectively move the detent in one of the annular grooves 72, 73 or 74. The cammed detent sleeve spring 80 is biased to a compressed position to allow the detents 69 to move radially inward and out of the grooves as it is moved selectively from one groove to another. For manual operation, as described, the load piston 77 is biased to the extreme left hand position as shown wherein the stem 84 engages the washer 85 preventing the detent sleeve return spring 89 from forcing the washer 88 into an engaging position with the cammed detent sleeve 82.

When the inching valve is operated, it will control the operation of the brake 39 and any one of the clutches 44, 45 and 46. By pivotally operating the clutch pedal 8 and the lever 4 in a clockwise movement, the spool 14 will move axially to the left. This in turn will throttle pressurized fluid from the pump 40 as it flows through the inching valve. Continued clockwise movement of the clutch pedal as shown in FIG. 1 will completely interrupt flow of pressurized fluid through the inching valve to the selector valve and operate the transmission brake 39. Throttling of the pressurized fluid through the inching valve to the selector valve will decrease the pressure in the inching valve output passage 34. This in turn will reduce the pressure in the radial passage 76 of the selector valve 43 and the pressurizing chamber 176. With the reduction in pressure in the pressure chamber 176, the load piston 77 is allowed to move to the right against the detent sleeve spring 80 in response to the camming sleeve return spring 89. This in turn allows the detents 69 to move radially inward and retract from the annular groove in which they are positioned. The spool return spring 91 returns the spool to the extreme left hand position in which the sleeve 68 engages the end wall 93 and the detent elements 69 can expand radially into the annular recess 74 for the low range position of the selector valve.

As the pressure of the pressurized fluid increases in the pilot passage 76 and the pressurizing chamber 176, as the inching valve is operated, inching is provided in the low speed range of the selector valve. This allows a degree of slippage depending on the throttling of hydraulic fluid in the inching valve as the pressurized fluid from the pump is supplied to the selector valve. Accordingly, regardless of the position of the selector valve whether it be in the low, intermediate or high speed range, the selector valve will always move to the low speed range position when the inching valve is operated. This assures that the inching valve will not operate through the selector valve in another speed range because the operation is automatic.

When the inching valve is returned to its retracted clutch operating position as shown in FIG. 1, the retraction spring 49 returns the lever 4 to the position as shown and communication is provided from the pump through the inching valve to the selector valve. The selector valve can then be manually operated to selectively shift the selector valve to any one of the low, intermediate or high speed ranges.

The embodiments of the invention in which an exclusive property or privilege is claimed are defined as follows:

1. A detent mechanism in a hydraulic system comprising, a spool valve including a housing defining a cylindrical opening and having a plurality of annular grooves formed therein, a spool received in the cylindrical opening, a sleeve connected to said spool of said valve defining a plurality of radial openings for selective alignment with each of said annular grooves, a return spring means normally biasing said spool to a return position, a plurality of detent elements in said radial openings, camming means reciprocally mounted in said sleeve for selectively camming said detent elements into said annular grooves, a detent actuating means biasing said camming means and said detent elements radially outward in said openings in a selected one of said grooves, a detent release means biasing said camming means for release of said detent elements from said annular grooves, a load piston received in said sleeve defining a fluid pressure chamber and normally biasing said release means to a disengaging position with said camming means when said detent elements are engaged, said piston disengaging said release means permitting said release means to disengage said detent means responsive to a decrease in pressure in said fluid pressure chamber.

2. A detent mechanism in a hydraulic system as set forth in claim 1 wherein said load piston includes means restraining said detent release means from biasing said camming means to release said detent elements from said annular groove.

3. A detent mechanism in a hydraulic system as set forth in claim 1 wherein said detent elements define spherical members.

4. A detent mechanism in a hydraulic system as set forth in claim 1 wherein said detent actuating means includes a spring engaging said load piston for biasing said detent elements for engagement in said grooves.

5. A detent mechanism in a hydraulic system as set forth in claim 1 wherein said sleeve defines a spring seat for engaging said return spring for biasing said spool to the return position.

6. A detent mechanism in a hydraulic system as set forth in claim 1 wherein said load piston and said sleeve define a pressure chamber, means defining a pilot passage connected to said pressure chamber for conveying pressurized fluid for operating said load piston responsive to decay of hydraulic pressure in said spool valve.

7. A detent mechanism in a hydraulic system as set forth in claim 1 including means defining a pilot line in said spool, said spool and said load piston defining a pressure chamber in communication with said pilot line, said detent actuating means including a spring connected between said load piston and said detent actuating means resiliently biasing said detent elements into said annular grooves.

8. A power shift transmission including a hydraulic system as set forth in claim 1 including means defining a pilot line in said spool in communication with said pressurizing chamber for transmitting a decrease in pressure from said inching valve to allow said detent mechanism to shift said spool to the low range position.

9. A power shift transmission including a hydraulic system as set forth in claim 1 wherein said spool defines a pilot passage in communication with said inching valve for transmitting a decay in pressure to that said pressurize chamber to release said detent mechanism as said load piston releases the force on said detent member allowing said detent release means to release the said detent mechanism, said return spring on said spool returns said spool to the low range for engaging the detent mechanism in the position defined by said low range for said power shift transmission.

10. A power shift transmission including a hydraulic system comprising, a source of pressurized fluid, an inching valve for manually modulating pressurized fluid from said source of pressurized fluid, a selector valve in communication with said inching valve for selectively engaging one of a plurality of speed ratios in said power shift transmission, said selector valve including a housing defining a cylindrical opening having a plurality of annular recesses formed therein, a spool received in said opening, a sleeve connected to said spool of said valve defining a plurality of radial openings for selective alignment with each of said annular grooves, a return spring normally biasing said spool to a return position, a plurality of detent elements in said radial openings, camming means reciprocally mounted in said sleeve for selectively camming said detent elements into selected of said annular grooves, a detent actuating means including a load piston resiliently biasing said camming means and said detent elements radially outward in said openings in selected of said grooves, a detent release means for biasing said camming means for release of said detent elements from said annular grooves, said load piston received in said sleeve defining a fluid pressure chamber for receiving pressurized fluid, detent release means biasing said camming means for release of said detent elements from said annular groove when the pressure decays in said pressure chamber, said spool return means thereby returning said spool to the retracted position to engage a selected of said gear ratios when pressure decays in said pressurizing chamber.

11. A power shift transmission including a hydraulic system as set forth in claim 10 wherein said selector valve includes manual means for operating said valve.

12. A power shift transmission including a hydraulic system as set forth in claim 10 wherein said spool defines a pilot line in communication with said pressure chamber for conveying pressurized fluid for controlling the movement of said load piston responsive to decay in pressure of pressurized fluid from said inching valve.

13. A power shift transmission including a hydraulic system as set forth in claim 10 wherein said selector valve includes at least two forward speed ranges, said annular grooves define positions for said speed ranges of said transmission, said spool returning to a low range position responsive to pressure decay in the said pressurizing chamber.

14. A power shift transmission including a hydraulic system as set forth in claim 10 wherein said spool in said selector valve define a plurality of speed ranges, said annular grooves receive said detents to define said speed ratios of said spool valve and said return spring biases said spool to the low range position when the pressure decays in said pressurize chamber.

* * * * *